Sept. 2, 1930.   P. MacKENZIE   1,774,986
METALLIC HOSE
Filed April 11, 1928
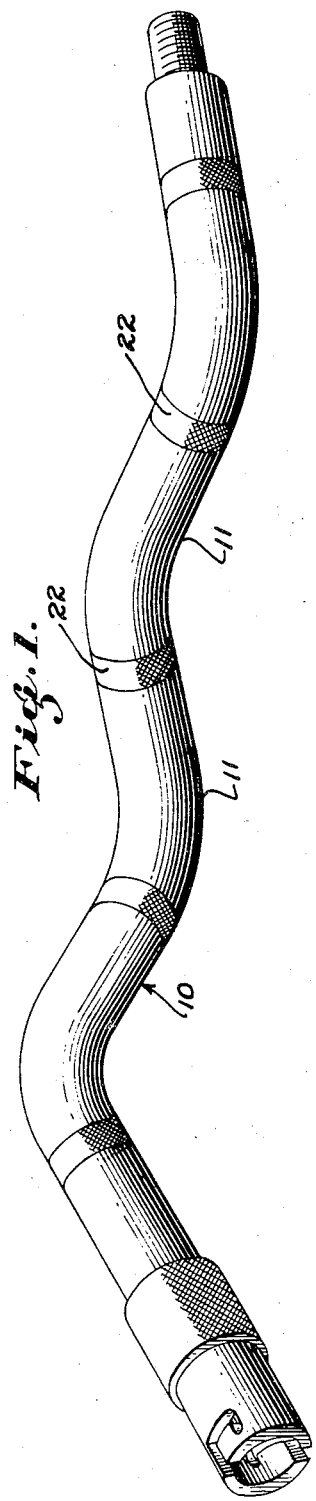
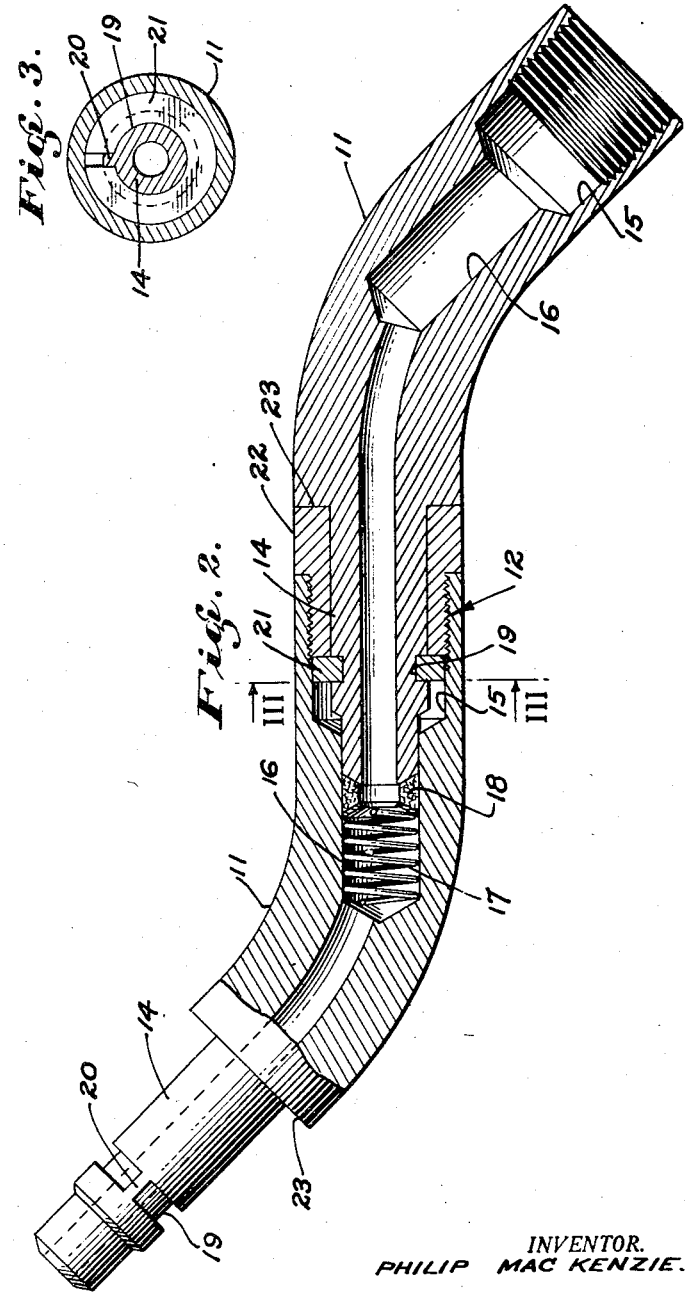
INVENTOR.
PHILIP MAC KENZIE.
BY
ATTORNEYS.

Patented Sept. 2, 1930

1,774,986

UNITED STATES PATENT OFFICE

PHILIP MacKENZIE, OF OAKLAND, CALIFORNIA, ASSIGNOR, BY MESNE ASSIGNMENTS, TO GAT GUN LUBRICATING CORPORATION, OF OAKLAND, CALIFORNIA, A CORPORATION OF CALIFORNIA

METALLIC HOSE

Application filed April 11, 1928. Serial No. 269,041.

This invention relates to metallic hose such as disclosed in my prior application entitled "Flexible metal hose", S. N. 96,460, filed March 22, 1926.

This prior application discloses a metallic hose primarily intended for use in connection with high pressure lubricating guns and is composed of a plurality of bent tubular sections coupled together to permit relative turning movement. The shape of the sections and the swivel connections therebetween enables the hose to be twisted into various shapes so that when in use it may be bent to reach lubricating fittings on an automobile located in places difficult to gain access to. The swivel connections connecting the bent sections of hose each include a key driven into a circular keyway formed in both adjoining sections, which key effectively locks the sections together so that they are for all practical purposes inseparable.

It is the principal object of the present invention to generally improve the construction and operation of metallic hose of the character referred to by providing an improved connection for connecting the bent rigid sections, which connection is simple and efficient, permits the sections to be detachably connected and affords entire freedom of movement between the sections so that the hose may be easily twisted into any desired shape.

One form which the invention may assume is exemplified in the following description and illustrated by way of example in the accompanying drawings, in which:

Fig. 1 is a perspective view of a metallic hose embodying the preferred form of my invention.

Fig. 2 is an enlarged view of two connected sections partially in central section to disclose the swivel connection therebetween.

Fig. 3 is a cross-sectional view through the swivel connection taken on line III—III of Fig. 2.

Referring more particularly to the accompanying drawings, 10 indicates a hose composed of a number of rigid tubular sections 11 each of which is bent to an angle preferably greater than ninety degrees. These sections 11 are detachably connected by means of a swivel joint 12 which is best illustrated in Fig. 2.

Reference being had to this figure it is seen that the swivel joint 12 is formed by forming one end of each section with a reduced shank 14 and the other end with a counterbore 15. The shank 14 of one section is adapted to extend within the counterbore 15 in the contiguous end of the adjacent section 11. The extremity of the shank 14 is further reduced in diameter and snugly fits within a short packing bore 16 formed as a continuation of the counterbore 15.

A spring 17 is arranged in the packing bore 16 and packing 18 is interposed between the spring and the beveled end of the shank 14. The resulting wedging action presses the packing against the sides of the packing bore 16 and prevents the leakage of grease through the connection between the sections. Therefore, the grease must flow through the interior of the sections.

The shank 14 is formed with a circular keyway 19 which extends almost completely around the shank at a point intermediate the ends thereof. The portion of metal or a lug 20 which separates the ends of the keyway may be interposed after the keyway is cut if desired. A circular key 21 is arranged in the keyway 19 with its ends engaging the opposite sides of the lug 20, so that it is held from rotation. The exterior diameter of this key 21 agrees with the interior diameter of the counterbore 15 to form a bearing for the end of the section within which the counterbore is formed.

The counterbore 15 is interiorly threaded between the key 21 and its outer end so that it may be threadedly connected to the reduced and threaded portion of a nut 22 rotatably mounted on the shank 14 between the key 21 and a shoulder 23 defining the inner end of the shank 14. The exterior diameter of the nut and sections 11 are exactly the same diameter so that when the different sections are assembled to form a hose, the latter will present an uninterrupted surface.

To connect the sections 11, the nut 22 is arranged on the shank 14 and the key 21 is engaged with the keyway 19 to retain the nut 22 between the key and the shoulders 23. The spring 17 and packing 18 are then placed in the packing bore 16 and the outer end of the shank 14 is inserted into the bore 16 against the packing. The threads of the counterbore are then engaged with the threads of the nut 22 and the two elements are tightly threaded together.

As the nut 22 is tightly connected to one section 11 and may revolve on the shank of the adjacent section, the two sections will be permitted to revolve relatively. However, as the nut 22 is interposed between the key 21 and the shoulder 23, it cannot move axially so that the two sections will be swivelly connected.

If it is desired to disconnect the sections 11, it is only necessary to hold the nut 22 or the section 11 to which the nut is threaded and disconnect the two elements. This permits the sections to be easily assembled or disconnected as desired.

The hose may be composed of as many sections 11 as desired, all of which are connected by a swivel joint as described. The connection between the sections and the shape of the latter enables the hose to be twisted into various shapes. One end of the hose may be connected to any type of grease gun while the other end may be provided with a fitting suitable for connecting the hose to a desired type of lubricating fitting.

From the foregoing it is obvious that I have provided an improved flexible metallic hose composed of sections swivelly connected, which may be easily and quickly disconnected if desired.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A swivel joint for the abutting ends of sections of pipe, one of said sections being counter bored forming a packing gland therein, said counter bore being enlarged at its outer end and internally screw-threaded, the other of the sections having a reduced portion for insertion within the counter bore and having an annular key-way formed therearound, a sleeve having a reduced externally screw-threaded portion for engagement with the internally screw-threaded portion of the enlarged bore, a key within the key-way, packing within the packing gland, and a spring for urging the packing against the end of the reduced portion.

2. A swivel joint for the abutting ends of sections of pipe, one of said sections having a reduced portion forming a shoulder therearound, a key-way formed therein and spaced from the shoulder, the reduced portion being further reduced for introduction within the packing gland, packing within the gland, a spring intermediate the end of the reduced portion and the end of the gland, the bore of the other of said sections being enlarged at its outer end and internally screw-threaded for screw-threaded engagement with the sleeve, and a key within the key-way for securing the end of the sleeve against the shoulder.

PHILIP MacKENZIE.